United States Patent
Burr

(10) Patent No.: US 9,402,382 B2
(45) Date of Patent: Aug. 2, 2016

(54) EQUINE BOOT FOR TREATMENT OF LAMINITIS

(71) Applicant: Michelle Burr, Weston, CT (US)

(72) Inventor: Michelle Burr, Weston, CT (US)

(*) Notice: Subject to any disclaimer, the term of this patent is extended or adjusted under 35 U.S.C. 154(b) by 484 days.

(21) Appl. No.: 13/887,789

(22) Filed: May 6, 2013

(65) Prior Publication Data

US 2014/0144109 A1    May 29, 2014

Related U.S. Application Data

(60) Provisional application No. 61/642,669, filed on May 4, 2012, provisional application No. 61/757,960, filed on Jan. 29, 2013.

(51) Int. Cl.
*B68C 5/00* (2006.01)
*A01L 15/00* (2006.01)
*A01K 13/00* (2006.01)

(52) U.S. Cl.
CPC .............. *A01L 15/00* (2013.01); *A01K 13/007* (2013.01)

(58) Field of Classification Search
CPC ............................. A01K 13/007; A01L 15/00
USPC ............................................................. 54/82
See application file for complete search history.

(56) References Cited

U.S. PATENT DOCUMENTS

| | | | | |
|---|---|---|---|---|
| 205,159 | A * | 6/1878 | Wemple | A01K 13/007 168/2 |
| 342,790 | A * | 6/1886 | Penton | A01K 13/007 54/82 |
| 349,668 | A * | 9/1886 | John | A01K 13/007 168/2 |
| 5,983,611 | A | 11/1999 | Smahl | |
| 7,178,321 | B2 | 2/2007 | Ruetenik | |
| 7,445,051 | B2 | 11/2008 | Ruetenik | |
| 7,493,963 | B2 | 2/2009 | Ford | |
| 7,559,910 | B2 | 7/2009 | Daly | |
| 7,762,048 | B1 | 7/2010 | LeCompte | |
| 7,818,952 | B1 | 10/2010 | LeCompte | |
| 8,147,430 | B2 | 4/2012 | Abdullah | |
| 8,196,378 | B2 * | 6/2012 | Ford | A01K 13/007 168/18 |
| 2010/0223893 | A1 * | 9/2010 | D'Arpe | A01L 15/00 54/82 |
| 2011/0000173 | A1 * | 1/2011 | Lander | A01K 13/007 54/82 |
| 2014/0251642 | A1 * | 9/2014 | Revheim | A01L 3/02 168/18 |

* cited by examiner

*Primary Examiner* — Kristen C Hayes
(74) *Attorney, Agent, or Firm* — Ware, Fressola, Maguire & Barber LLP

(57) ABSTRACT

A boot for treating laminitis in horses has a hoof casing snugly receiving an supporting a horny hoof wall of the laminitic hoof and a sole pivotally attached to the hoof casing such that the laminitic hoof may pivot with respect to the sole while the sole is planted on ground, thereby reducing stress on the inflamed laminae. A bearing assembly disposed between the hoof casing and the sole facilitates pivoting, and friction adjustment may be provided.

18 Claims, 4 Drawing Sheets

EQUINE BOOT FOR TREATMENT OF LAMINITIS

RELATED APPLICATIONS

This application claims benefit of priority to my U.S. Provisional Application 61/642,669 filed May 4, 2012 and my U.S. Provisional Application 61/757,960 filed Jan. 29, 2013.

FIELD OF THE INVENTION

The invention herein relates to an equine boot for treating and promoting the healing of laminitis and other injuries and afflictions of the legs of horses and other ungulates.

BACKGROUND OF THE INVENTION

Equine laminitis is a vascular disease associated with areas of ischemia or hemostasis within the laminae. The laminae secure the coffin bone/distal phalanx to the outer keratinous hoof wall of a horse. Inflammation associated with delamination interferes with the wall/bone bond. In advanced laminitis, the coffin bone becomes detached from the horny keratinous hoof wall and may rotate or sink. In lay terms, this is known as "founder," from the maritime term meaning to sink. Ungulates other than horses, including cattle, may suffer from laminitis. However, as treatment is more often undertaken with respect to horses, the discussion herein shall relate to horses but it will be understood that it is applicable to other ungulates as well.

Known treatments of laminitis includes the provision of boots that enclose the hoof structure and are sized and shaped to support the hoof structure in a position that reduces pain and promotes healing. These boots often include pads of gel or other resilient substances designed to contribute to the support of the hoof structure and to cushion the hoof structure. Such boots are partially successful and beneficial.

Nevertheless, horses suffering from laminitis exhibit signs of extreme discomfort and pain. One indicator of such discomfort and pain is the reluctance of a horse to turn when standing in its stall or when walking. Horses with foreleg laminitis have been observed rocking back to place the majority of their weight on their rear legs and pivoting on their rear legs in order to achieve a change of direction. One explanation for this is believed to be that when a horse is standing, the outer horny hoof wall of the afflicted hoof is planted and stationary with respect to the ground, and when the horse turns, the remaining hoof and foreleg structure rotates with respect to the planted horny hoof wall, thereby stressing and further aggravating the laminae of the hoof structure. If this stress on the laminae could be avoided or reduced, the horse would experience less pain and the laminae would heal more quickly.

Also, it may be that in some cases of laminitis, inflammation is aggravated by pressure on inflamed area surrounded by horny hoof wall, which may descend into contact with the ground. In such cases, relieving such pressure may prove beneficial.

Accordingly, improvement in treating and promoting the healing of laminitis in ungulates, and especially horses, would be a highly desirable advancement in the art.

SUMMARY OF INVENTION

Accordingly, a principal object of the invention herein is to improve treatment and promote healing of equine laminitis.

An additional object of the invention herein is to reduce the pain and discomfort of a horse suffering from equine laminitis.

A further object of the invention is to increase the mobility of a horse suffering from equine laminitis.

In carrying out the invention herein, a boot has a hoof casing sized and adapted to be snuggly received surrounding and supporting the horny hoof wall of a laminitic hoof. A sole is pivotally attached to the hoof casing, such that the hoof casing and laminitic hoof received therein may pivot with respect to the sole. This permits the hoof to turn and change direction with respect to the sole of the boot when the sole is planted on the ground or stable floor, whereby turning may be accomplished with reduced movement between the hoof wall and the remaining hoof and foreleg structure.

In one aspect of the invention, the force required to pivot the hoof casing with respect to the sole may be selected to minimize stress on the laminae while providing sufficient resistance to pivoting rotation to make the horse confident in its footing and thereby trusting in the use of the equine boot.

In one embodiment, a bottom surface of the hoof casing and an upper surface of the sole frictionally engage to provide the desired combination of freedom of and resistance to rotational movement. The coefficient of friction between the two surfaces may be selected to achieve the desired combination.

In another embodiment, the sole has an upturned skirt that surrounds and frictionally engages a cooperative peripheral surface of the hoof casing. The skirt may be provided with a compressive adjustment to achieve the desired combination of freedom of and resistance to rotational movement.

In a further embodiment, the sole is rotationally mounted by a pivot connector in the form of a bearing assembly for low resistance rotation with respect to the hoof casing.

In another aspect of the invention, a casing base plate of the boot has an open central area to relieve pressure. This aspect of the invention may be utilized with or without a pivoting sole.

In an additional aspect of the invention, the upper hoof casing incorporates one or more pads to provide support and cushioning to the laminitic hoof.

Other and more specific objects and features of the invention herein will in part appear in the detailed description of the invention and the claims, taken together with the drawings.

BRIEF DESCRIPTION OF THE DRAWINGS

The same reference numerals refer to the same elements throughout the various figures.

DETAILED DESCRIPTION OF THE INVENTION

The invention herein relates to an equine boot for treating laminitis, the boot being characterized by a pivotable sole that permits the horse to turn with reduced force on the laminae connecting the outer hard horny hoof wall with the internal hoof and foreleg structure.

Figure 1:
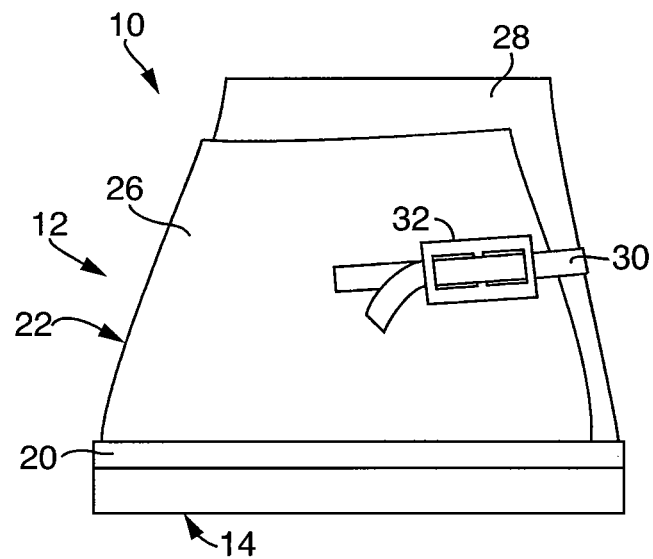
FIG. 1 is a side elevation view of an equine boot according to the invention herein.
Figure 2:
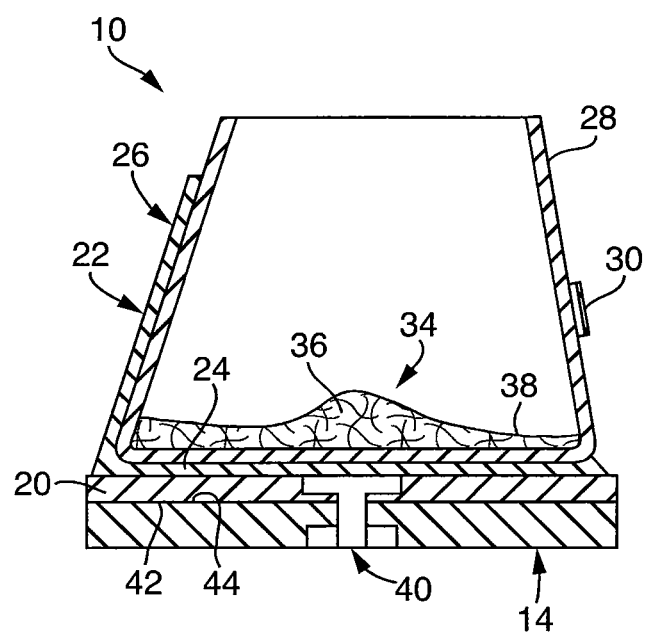
FIG. 2 is a sectional view of the equine boot of FIG. 1.

With reference to FIGS. 1 and 2, a first equine boot 10 according to the invention herein is shown. It has an upper hoof casing 12 and a sole 14 pivotally attached thereto. The hoof casing 12 is sized and shaped to receive and support the hoof of a horse, and the sole is positioned below the hoof casing 12 and a horse's hoof received therein, such that the horse's weight is transmitted to the ground by the sole.

The hoof casing 12 has a casing base plate 20 which is generally deployed across the bottom of the horse's hoof. The casing base plate 20 is rigid, and may be metal or a rigid polymer. A casing outer shell 22 has an annular upper collar 26 generally surrounding the horse's hoof and a bottom panel 24 extending across and attached to the casing base plate 20. The hoof casing 12 further has a flexible inner shell 28 that fits over the horse's hoof, and is substantially surrounded by the casing outer shell 22. The casing outer shell 22 is provided with a fastener, namely a strap 30 and buckle 32, which may be tightened to secure the outer shell 22 and inner shell 28 in position surrounding the horse's hoof. Also, the inner shell 28 may be provided with a pad 34, which has a central portion 36 shaped to support and cushion the bottom central portion of the horse's hoof, as is known in the art of equine boots for treating laminitis. The horny hoof wall is generally peripheral, and is supported by the outer peripheral portion 38 of pad 34.

The sole 14 is pivotally attached to the casing base plate 20 by a pivot connector 40, which may be a large rivet or may be a nut and bolt connector generally centrally located with respect to the casing base plate 20 and sole 14. The nut and bolt may be loosely tightened permitting relatively free pivoting movement between the casing base plate 20 and the sole 14 when there is no weight on the equine boot 10. The casing base plate 20 has a bottom friction surface 42, and the sole 14 has an upper friction surface 44, the friction surfaces 42 and 44 being in contact and frictional engagement when a horse is standing in the equine boot 10. Thus, the sole 14 is pivotal with respect to the upper hoof casing 12, with the pivotal movement restricted by the frictional engagement of the sole 14 and casing base plate 20. When a nut and bolt pivot connector 40 is used to pivotally attach the sole 14 to the casing base plate 20, the nut and bolt may be tightened to increase the frictional resistance to pivotal movement, if desired.

The available pivoting motion between the sole 14 and the upper hoof casing 12 permits the horse to turn without its horny hoof wall being planted. When the horny hoof wall is planted, any rotation of the coffin bone/distal phalanx with respect to the horny hoof wall stresses and further inflames the connecting laminae. Instead, when the sole 14 is planted, the hard hoof wall is at least partially decoupled from the surface on which the horse is standing or walking, and the hard hoof wall and the internal structure of the hoof turn together with the hoof casing 12. This substantially reduces stress forces on the laminae, decreases the pain experienced by the horse, and decreases inflammation to promote healing.

The frictional engagement between the sole 14 and the casing base plate 20 provides some resistance to the pivoting motion, which is believed advantageous for some horses to feel confident in their footing. It is believed that a satisfactory amount of friction would emulate the horse's turning on its hoof in a surface of very loose dirt or sand, those surfaces being generally known and acceptable to horses.

Figure 3:
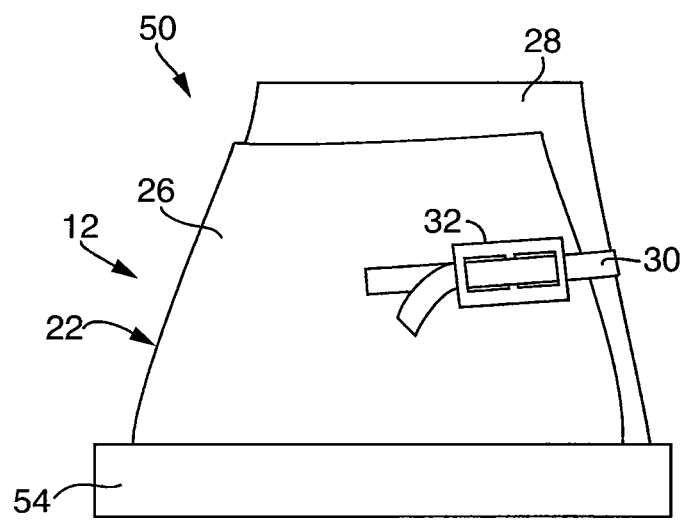
FIG. 3 is a side elevation view of another equine boot according to the invention herein.
Figure 4:
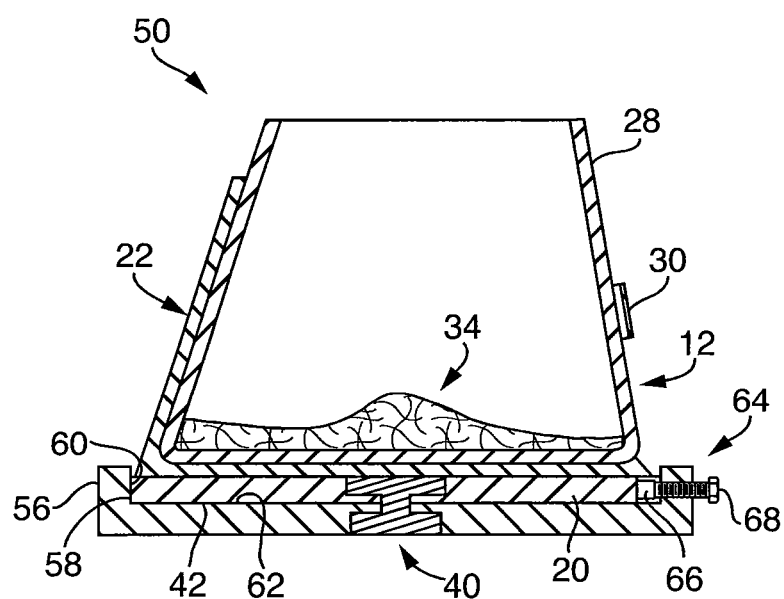
FIG. 4 is a sectional view of the equine boot of FIG. 3.

With reference to FIGS. 3 and 4, a second equine boot 50 according to the invention herein is illustrated. It has a hoof casing 12 which may be the same as the hoof casing 12 utilized in the equine boot 10 described above. Thus, the hoof casing 12 includes casing base plate 20, seen in FIG. 4. The equine boot 50 may also be provided with a pad 34 for cushioning and supporting the afflicted hoof, as is known.

The equine boot 50 has a sole 54 that is pivotally attached to the casing base plate 20 by pivot connector 40. The sole 54 is characterized by an upstanding peripheral skirt 56 that surrounds the outer periphery 58 of the casing base plate 20. The outer peripheral surface 58 is circular and the interior surface 60 of upstanding skirt 56 is also circular, such that the sole 54 and its skirt 56 may pivot beneath the casing base plate 20. The sole 14 and casing base plate 20 provided in the equine boot 10 described above may also be circular, but may be provided in other shapes because the sole 14 pivots under the casing base plate 20 and does not engage the periphery of the casing base plate 20.

With respect to equine boot 50, the casing base plate 20 and the sole 54 have respective friction surfaces 42 and 62, which engage and provide resistance to pivotal movement between the casing base plate 20 and the sole 54, as generally described above for equine boot 10.

The equine boot 50 is characterized by an additional friction adjustment mechanism 64, which in the embodiment shown comprises a friction block 66 adjustably biased against the outer periphery 58 of the casing base plate 20 by adjustment screw 68. Tightening the friction block 66 causes the inner peripheral surface 60 of the skirt 56 to bear against the outer periphery 58 of the casing base plate 20, providing adjustable additional resistance to pivotal motion between the casing base plate 20 and the sole 54.

In the equine boot 50, the friction surfaces 42, 62 of the casing base plate 20 and sole 54 may be selected with low coefficients of friction to provide lower frictional resistance to rotation than in the equine boot 10. Therefore, a very light resistance to pivotal motion may be employed in treating the equine laminitis, and the friction adjustment mechanism 64 can be utilized to increase the resistance to pivotal movement between the casing base plate 20 and sole 54 in the event that the horse appears to lack confidence in its footing at a lower level of resistance.

Figure 5:
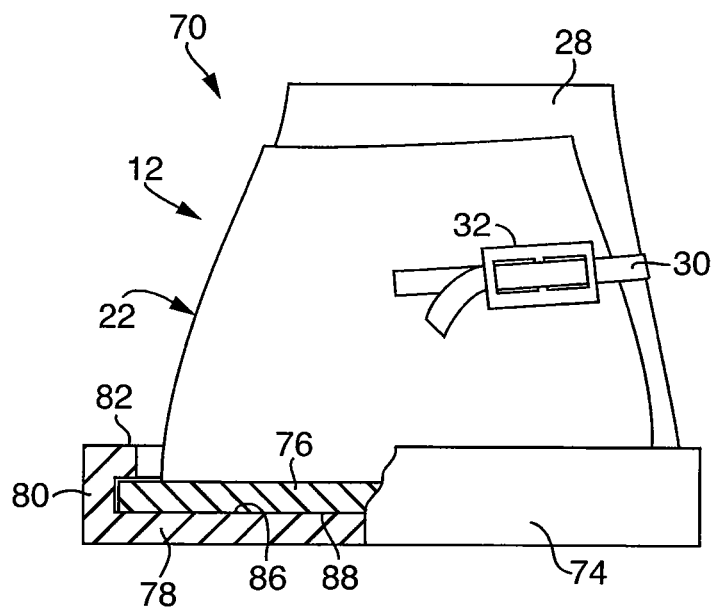
FIG. 5 is a side elevation view, partially cut away, of another equine boot according to the invention herein.

With reference to FIG. 5, an equine boot 70 with an alternative sole 74 and casing base plate 76 is illustrated, and may be utilized with the outer shell 22 and inner shell 28 of upper boot casing 12 similar to that described above and attached to the casing base plate 76. The sole 74 is characterized by having a bottom panel 78 and an upstanding peripheral skirt 80 with an inturned flange 82 at the upper end of the skirt 80. The flange 82 fits over the casing base plate 76, and thereby retains the sole 74 on the casing base plate 76 while permitting relative rotational pivoting motion between the sole 74 and the casing base plate 76. Thus, the need for a central pivot connector such as the pivot connector 40 described above is eliminated and replaced by a peripheral pivot connector provided by the configuration of the casing base plate 76 and sole 74. The sole 74 has a friction surface 86 which engages the friction surface 88 of the casing base plate 76, and the coefficients friction of these two surfaces determine the resistance to rotational pivoting movement.

Figure 6:
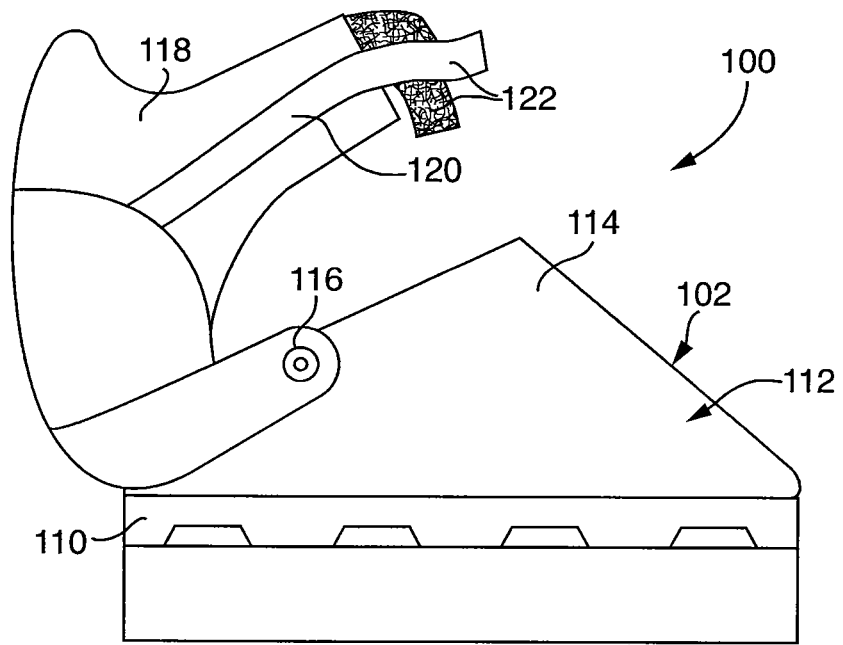
FIG. 6 is a side elevation view of another equine boot according to the invention herein.
Figure 7:
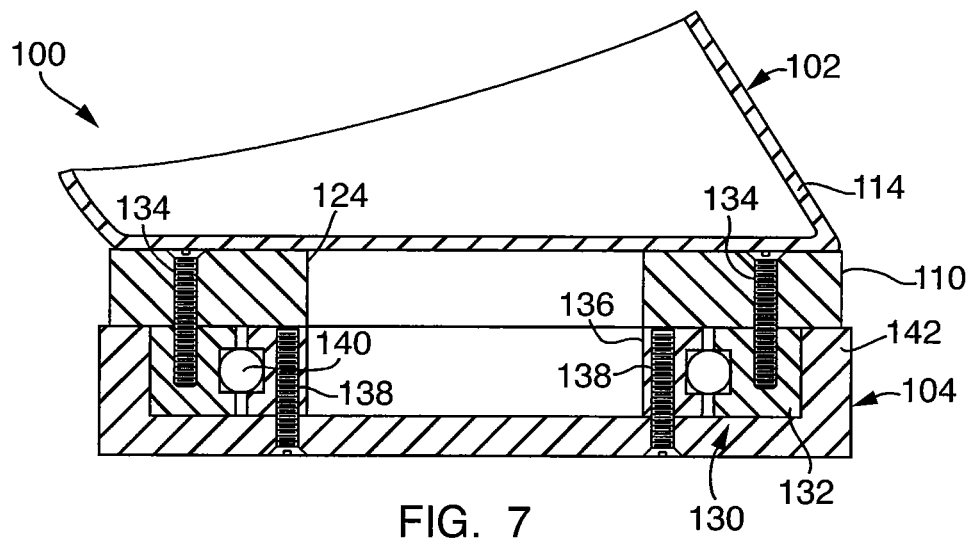
FIG. 7 is a sectional view, partially cut away, of the equine boot of FIG. 6.
Figure 8:
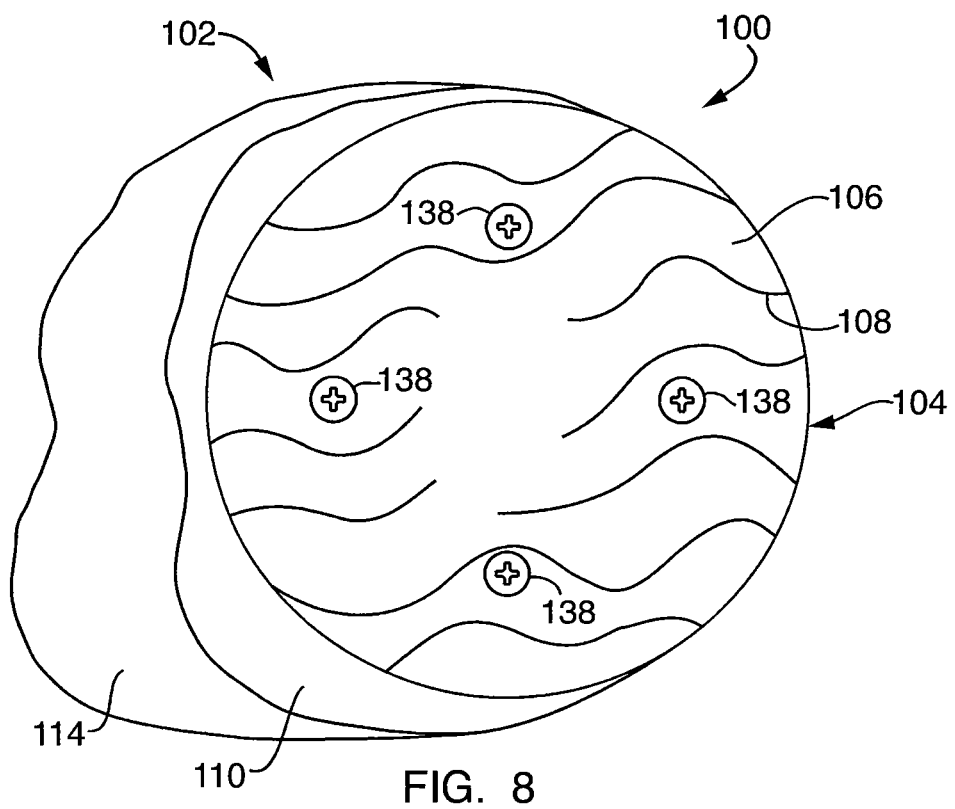
FIG. 8 is a bottom view of the equine boot of FIG. 6.

With reference to FIGS. 6-8, another equine boot 100 according to the invention herein is shown. It has an upper hoof casing 102 and a sole 104 pivotally attached thereto. The hoof casing 102 is sized and shaped to receive the hoof of a horse, and is a modified form of the Easyboot Glove made by Easy Care, Inc., Model # SB-EB6L. The modification is described below.

The hoof casing 102 has a casing base plate 110 which is generally deployed across the bottom of the hoof casing to support the horse's hoof. The casing base plate 110 is a rigid polymer. A casing outer shell 112 extends upwardly from the casing base plate 110 and has an annular collar 114 generally surrounding the horse's hoof. The hoof casing 102 further has a substantial attachment band 118 that fits around the horse's middle phalanx, and is attached to the collar 114 at 116. The attachment band 118 is provided with a strap 120 and Velcro fasteners 122, which may be engaged to secure the hoof casing 102 in position on the horse's hoof.

As best seen in FIG. 7, the casing base plate 110 has a central opening 124 formed therein, which is a modification of the Easyboot Glove product referenced above. Alternatively, the casing base plate 110 may be solid and a pad 34 may be provided.

The sole 104 is pivotally attached to the casing base plate 110 by a pivot connector, which in the equine boot 100 is a bearing assembly 130. A suitable bearing assembly is made by VXB Ball Bearings, Part # KIT 12876. As best seen in FIG. 7 the bearing assembly 130 is a ball bearing assembly having an outer race 132 that is secured to the casing base plate 110 by threaded fasteners 134, and an inner race 136 that is secured to the sole 104 by threaded fasteners 138, with balls 140 therebetween. This provides a low friction interface between the upper hoof casing 102 and the sole 104. Other bearing assemblies may also be used, including roller bearings and other configurations of ball bearing assemblies.

The sole 104 has an upturned peripheral flange 142 that surrounds the bearing assembly 130. Frictional resistance to the pivoting motion may be provided between the outer race 132 attached to the casing base plate 110 and the peripheral flange 142 of the sole 104, if desired, such as by the adjustment mechanism 64 described above. Alternatively, the outer race 132 may be secured to the sole 104 and the inner rase may be secured to the base plate 110 and frictional resistance to pivoting motion may be provided, if desired, between the inner race 136 and the sole 104.

The sole 104 is a rigid polymer, and as best seen in FIGS. 7 and 8, is provided with an outer tread 106 of a less rigid polymer. The tread 106 defines a tread pattern 108 seen in FIG. 8, such that the outer tread provides good traction, especially on smooth surfaces.

With reference to FIG. 7, the central opening 124 in the base plate 110 itself may alleviate pressure from the founder condition, and thereby relieve some pain experienced by a horse suffering from laminitis. This is achieved with or without a pivotally attached sole, i.e. the sole may be fixed with respect to the hoof casing.

Accordingly, equine boots have been described which reduce the stress on laminae during turning movement by horses suffering from laminitis. It will be appreciated that the embodiments shown are illustrative of the principles of the invention, and that changes may be made by those skilled in the art without departing from the spirit and scope of the invention, which is set forth in the following claims.

I claim:

1. A boot for treating laminitic hooves of ungulates such as horses, comprising:
    A) a hoof casing sized and adapted to be snugly received surrounding and supporting a horny hoof wall of a laminitic hoof; and
    B) a sole pivotally attached to the hoof casing below a laminitic hoof received in the hoof casing,
       whereby the hoof casing and a laminitic hoof received therein may pivot with respect to the sole while the sole is planted on ground.

2. A boot as defined in claim 1 wherein the sole is pivotally attached to the hoof casing by a pivot connector.

3. A boot as defined in claim 2 wherein the pivot connector is a bearing assembly disposed between the hoof casing and the sole.

4. A boot as defined in claim 3 wherein the hoof casing has a casing base plate juxtaposed the sole, and the bearing assembly is disposed between the casing base plate and the sole.

5. A boot as defined in claim 4 wherein the bearing assembly is a ball bearing assembly having an outer race and an inner race, the outer race being attached to one of the casing base plate and sole and the inner race being attached to the other of the casing base plate and sole.

6. A boot as defined in claim 5 wherein the casing base plate defines an opening disposed above the sole and within the inner race of the ball bearing assembly, the casing base plate surrounding the opening being sized and positioned to support the horny hoof wall of a laminitic hoof.

7. A boot as defined in claim 4 and further comprising a pad generally centrally positioned on the casing base plate.

8. A boot as defined in claim 4 and further comprising a frictional adjustment mechanism for adjusting frictional resistance to relative pivoting of the casing base plate and sole.

9. A boot as defined in claim 4 wherein the hoof casing has fasteners for removably securing the hoof casing on a hoof.

10. A boot as defined in claim 4 wherein the casing base plate defines an opening disposed above the sole and within the inner race of the ball bearing assembly, the casing base plate surrounding the opening being sized and positioned to support the horny hoof wall of a laminitic hoof.

11. A boot as defined in claim 2 wherein the pivot connector is generally centrally located with respect to the casing base plate and sole.

12. A boot as defined in claim 11 wherein juxtaposed surfaces of the sole and casing base plate are frictionally engaged, and the pivot connector is a nut and bolt which may be adjusted to establish a desired amount of frictional engagement between the casing base plate and the sole.

13. A boot as defined in claim 2 wherein the pivot connector is a peripheral skirt and inturned flange, wherein the inturned flange fits over a periphery of the casing base plate.

14. A boot as defined in claim 1 wherein the hoof casing has a casing base plate juxtaposed the sole, and the pivot connector is bearing assembly disposed between the casing base plate and the sole.

15. A boot as defined in claim 1 wherein the hoof casing has fasteners for removably securing the hoof casing on a hoof.

16. A boot for treating laminitic hoofs of ungulates such as horses, comprising:
    A) a hoof casing sized and adapted to be snuggly received surrounding and supporting a horny hoof wall of a laminitic hoof, the hoof casing having a casing base plate defining an opening sized and positioned so that the horny hoof wall is supported by the casing base plate surrounding the opening defined therein,
    B) a sole attached to the casing base plate and extending across the base plate below the opening defined therein.

17. A device for treating hoofs of ungulates such as horses, comprising:
    A) a base plate having a surface positioned on a first plane, wherein the base plate is securable to the hoof of an ungulate; and
    B) a substantially planar sole positioned substantially parallel with the first plane and pivotally attachable to the base plate below the hoof to pivotally support the hoof on the ground, wherein the sole has an axis of rotation substantially perpendicular to the first plane;

whereby the hoof may turn with respect to the sole while the sole is planted on the ground.

18. A boot for treating hooves of ungulates such as horses, comprising:
   A) a hoof casing sized and adapted to be snugly received surrounding and supporting a horny hoof wall of a hoof; and
   B) a sole pivotally attached to the hoof casing below a hoof received in the hoof casing, whereby the hoof casing and a hoof received therein may pivot with respect to the sole while the sole is planted on ground.

\* \* \* \* \*